Patented Oct. 4, 1932

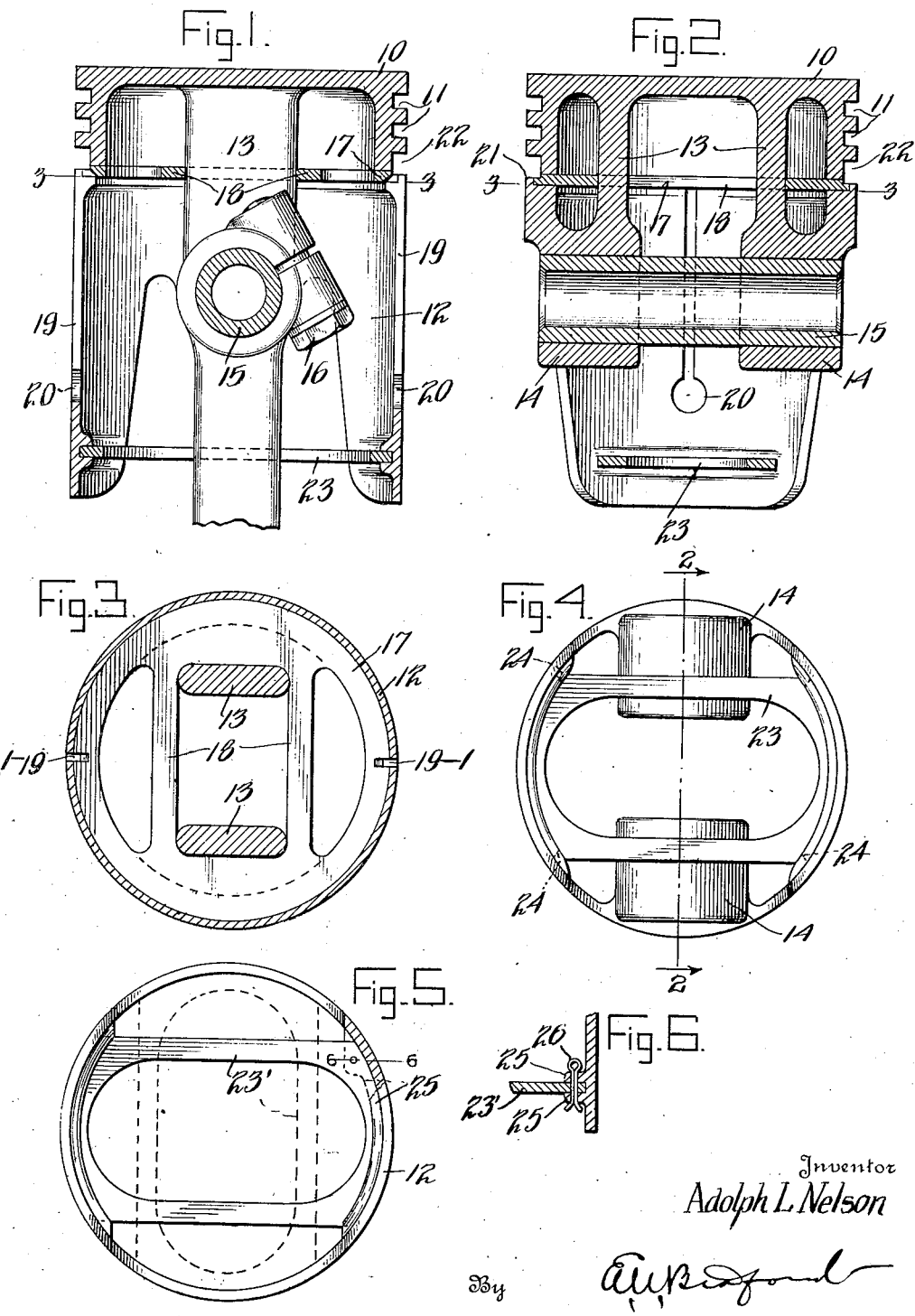

1,881,237

UNITED STATES PATENT OFFICE

ADOLPH L. NELSON, OF INDIANAPOLIS, INDIANA, ASSIGNOR TO BOHN ALUMINUM & BRASS CORPORATION, OF DETROIT, MICHIGAN

PISTON

Application filed February 7, 1923, Serial No. 617,586. Renewed February 18, 1926.

My said invention relates to piston construction it being an object thereof to provide a piston having substantially separate head and skirt portions with heat insulating means between them to cut off to a large extent the transmission of heat from the head to the skirt.

A further object of the invention is to provide means for bracing the skirt at its upper end to limit the expansion and contraction thereof.

Still another object is to provide means for limiting the contraction of the skirt at its lower end or for limiting both expansion and contraction at this point. As fully explained in my co-pending application No. 617,585 of even date herewith the struts practically prevent diametrical contraction of the skirt and do so the more effectively in this case as the piston is cast with the struts in place whereby the metal of the skirt is under strain when the casting cools, this strain being relieved by heating of the skirt. The bearings for the piston pin in this instance are closed and the skirt is cut away underneath and up alongside the bearings to provide opposed tongues here shown as tapering slightly toward the lower end. At the upper end the skirt is deeply slit at points in a plane at right angles to the pivot pin. When the skirt heats up the edges of the slits approach each other as do also the adjacent edges of the tongues by a sort of crawling motion about the circumference of the struts, but diametrical expansion is practically absent while diametrical contraction is inhibited by the struts. Hence the space between the cylinder and piston remains substantially constant, especially at the ends of the skirt, and this tends to preserve a thin film of oil between said parts and so conduces to a high degree of perfection in lubrication.

Referring to the accompanying drawings which are made a part hereof and on which similar reference characters indicate similar parts, Figure 1 is a section on line 1—1 of Figure 3, Figure 2 a vertical section on line 2—2 of Figure 4, Figure 3 a horizontal section on line 3—3 of Figure 1 looking upward, Figure 4 a horizontal section on line 3—3 of Figure 1 looking downward, Figure 5 a section similar to Figure 3 showing a modified form of the invention, and Figure 6 a detail of Figure 5.

In the drawings reference character 10 indicates a piston head having the usual grooves 11 to which is secured a skirt 12 by means of integral connecting columns 13 extending from the head down to the bearings 14 for the piston pin 15 which is loose in the bearings 14. The head of the pitman or connecting rod 16 is split and is clamped to the pin by a bolt 16'. The head is wide enough to fit closely between the ends of bearings 14 and thus prevent endwise movement of the pin 15, which rocks with the rod. Alternatively I may split the bearings on the skirt and journal the connecting rod loosely on the pin. A disk-shaped strut 17 is interposed between the head and the skirt, the strut having parallel cross members 18 lying close to opposite sides of the columns 13. The cross members are separated by a diametrical opening and other openings lie between them and the outer circular part of the disk. The skirt is cut away below the opposite piston pin bearings 14 to impart flexibility to the lower end thereof leaving downwardly tapering tongues and is provided at the sides furthest from the piston pin with saw cuts 19 leading down to the holes 20. It will be seen that the upper end of the skirt may expand slightly in opposite directions (Fig. 2) such expansion being somewhat limited by the engagement of the columns 13 with the upper strut while the contraction of the upper end of the skirt is limited by the engagement of its upper rim 21 with the outer edges of the strut. To insure the full separation of the head and the skirt at the circumference I cut the groove 22, after casting the piston, so deep that the cutting tool engages and cuts away a part of the outer edge of the upper strut. In the drawings the groove 22 is also the lower ring groove but it will be obvious that a separate groove may be formed for this purpose below and spaced from the ring grooves.

An obvious modification would be had by providing a flange on strut 17 engaging within the upper edge of the skirt.

The lower strut 23 extends across the piston transversely of the piston pin to connect the separate flanges near their lower extremities. As shown in Figure 4 this strut is permanently connected to the piston at opposite sides by having its end portions cut away in dovetail form as at 24, the material of the skirt being cast around said ends. The lower strut is more exposed than the upper and therefore I prefer the form shown with bracing members extending across the piston in the form of chords of a circle, as such a strut is not so easily deflected out of proper shape as is a circular strut.

In a modified form of the invention the strut 23' has parallel opposite sides and ridges 25 are cast at the inner side of each tongue of the skirt between which the ends of the strut may be received. For locating the strut it is placed in the position shown in dotted lines in Figure 5 and is then rotated to the full line position between the pairs of projections 25. A cotter pin 26 is inserted in registering holes formed respectively in one end of the strut and in the spaced projections 25 by means of which the strut is held in place. The strut in this instance serves only to limit the contraction of the lower members of the skirt and not to limit their expansion, the main purpose of my invention being to limit such contraction and maintain the diameter of the piston unimpaired whereby the best results will be had in the way of lubrication.

It will be seen that the upper strut which is a steel stamping will serve not only to limit the contraction and expansion of the upper end of the skirt but will also serve to some extent as a heat insulating means to protect the skirt from the heat of the head and thus will serve further to limit the expansion of the skirt, both the head and the skirt being formed preferably of any material having the necessary wearing qualities such e. g., as aluminum while the struts are made of steel or other material having a relatively low coefficient of expansion.

It will be obvious to those skilled in the art that my device may be modified in various ways without departing from the spirit of the invention and therefore I do not limit myself to the specific instrumentalities shown in the drawings and described in the specification but only as indicated in the appended claims.

Having thus fully described my said invention, what I claim as new and desire to secure by Letters Patent, is:

1. A piston comprising a head, a skirt split at the lower end to provide spaced tongues, a strut loosely engaging the tongues, paired projections on each tongue between which the ends of the strut are adapted to engage one of said pairs having openings registering with an opening near the corresponding end of the strut, and a holding device passing through said openings to maintain the parts in position, substantially as set forth.

2. A piston comprising a head, a skirt, a strut separating the head and the skirt at their outer periphery, and integral connections between the head and the skirt spaced from the periphery of the piston and homogeneous with the head and skirt, substantially as set forth.

3. In a piston, a head, a separately expansible skirt, a piston pin extending across the skirt, bearings on the skirt receiving the piston pin, integral columns connecting the head and said bearings and homogeneous with the head and bearings, and a disk separating the head and the skirt and apertured to accommodate said columns, substantially as set forth.

4. In a piston, a head, a separately expansible skirt, a piston pin extending across the skirt, bearings on the skirt for receiving the piston pin, one or more integral columns connecting the head and said bearings and homogeneous with the head and bearings, and a transverse strut extending across the upper end of the skirt to limit the contraction of the same, substantially as set forth.

5. A method of making pistons comprising casting a head and a skirt in one piece with a strut having its outer circumference embedded in the wall of the piston and with internal columns connecting the head and the piston skirt and thereafter cutting a circumferential groove through the wall of the piston to the circumference of the strut, substantially as set forth.

6. In a piston, a head, a separately expansible skirt having piston pin bearings said skirt being cut away below the piston pin bearings to provide opposed lower flanges and having opposed cuts in a plane perpendicular to the piston pin extending downward from the upper margin of the skirt, integral columns connecting the head and the piston pin bearings, and a collar surrounding the columns above the piston pin bearings said collar serving to limit the expansion of the skirt, substantially as set forth.

7. In a piston, a head, a separately expansible skirt having piston pin bearings said skirt being cut away below the piston pin bearings to provide opposed lower flanges and having opposed cuts in a plane perpendicular to the piston pin extending downward from the upper margin of the skirt, integral columns connecting the head and the piston pin bearings, and a strut engaging the upper end of the skirt at opposite sides to limit its contraction said strut having an aperture through which said columns pass and fitting closely against the outer faces of the columns to limit the expansion of the skirt, substantially as set forth.

8. In a piston, a head, a separately expansible skirt having piston pin bearings said skirt being cut away below the piston pin bearings to provide opposed lower flanges and having opposed cuts in a plane perpendicular to the piston pin extending downward from the upper margin of the skirt, integral columns connecting the head and the piston pin bearings, and a strut engaging the upper end of the skirt at opposite sides to limit its contraction said strut having an aperture through which said columns pass and closely fitting against the outer faces of the columns to limit the expansion of the skirt said strut separating the head from the skirt, substantially as set forth.

9. A piston having a head, integral piston pin bosses depending therefrom, a skirt separated from the head and having aprons spaced from the bosses, struts, of relatively inexpansible material spacing the skirt in relation to the head and bosses, and supplementary means for spacing the skirt in relation to the head and bosses, substantially as set forth.

10. In a piston, a skirt having spaced downwardly extending tongues and relatively inexpansible means extending chordally of the skirt for holding said tongues in their outermost position, substantially as set forth.

11. In a piston, a head, an independently expansible skirt cut away beneath the piston pin openings to provide opposed tongues, and a strut of relatively inexpansible material extending chordally of the piston and connecting the lower ends of the tongues, substantially as set forth.

12. In a piston, a head, an independently expansible skirt cut away beneath the piston pin openings to provide opposed tongues the skirt having vertical slits extending from its upper edge midway between the piston pin bearings, and struts of relatively inexpansible material extending across the ends of the skirt, substantially as set forth.

13. In a piston, a head, a skirt, and a relatively inexpansible circular strut engaging the skirt interiorly at its upper end said skirt exerting compression on the strut at working temperatures, substantially as set forth.

14. In a piston, a head, a skirt, a piston pin, and relatively inexpansible struts engaging said skirt above and below said piston pin said struts being subjected to inwardly directed tension by the skirt at working temperatures, substantially as set forth.

15. In a piston, a skirt having downwardly extending tongues, relatively inexpansible means limiting the contraction of the skirt in the region of said tongues, and quick-detaching means connecting the strut to the skirt, substantially as set forth.

16. A piston comprising a head, a skirt connected to the head, piston pin bosses, the skirt being formed with openings extending upwardly from the lower end thereof, and struts of relatively inexpansible material extending chordally of the skirt, the struts being located below the piston pin bosses.

17. A piston comprising a head, a skirt connected to the head, piston pin bosses, the skirt being of light-weight metal and formed with openings extending upwardly from the lower end thereof, and struts of material less expansible than that of the skirt, the struts extending chordally of the skirt and engaging opposite sides of the skirt, the struts being located below the piston pin bosses.

18. A piston comprising a head, a skirt and piston pin bosses, a pair of parallel control members located below the piston pin bosses and extending chordally across the skirt and engaging opposite sides of the skirt.

19. A piston comprising a head and skirt formed of light-weight material, piston pin bosses, and a pair of parallel control members formed of material less expansible than that of the skirt, the control members being located below the piston pin bosses and extending chordally across the skirt and engaging opposite sides of the skirt.

20. A piston comprising a head, a skirt and piston pin bosses, the skirt being formed with openings extending upwardly from its lower edge below the pin bosses, and a pair of parallel control members located below the pin bosses and extending chordally across the skirt and engaging opposite sides of the skirt.

21. A piston comprising a head and skirt formed of light-weight material, piston pin bosses, the skirt being formed with openings extending upwardly from its lower edge below the pin bosses, and a pair of parallel control members formed of material less expansible than that of the skirt, the control members being located below the piston pin bosses and extending chordally across the skirt and engaging opposite sides of the skirt.

22. A piston comprising a head, a skirt, and piston pin bosses, parts of the skirt forming opposite thrust faces, and a control member located below the pin bosses, the control member including an arcuate part in contact with each thrust face and parts extending chordally across the skirt.

23. A piston comprising a head and skirt formed of light-weight material, piston pin bosses, parts of the skirt forming opposite thrust faces, and a control member formed of material less expansible than that of the skirt and located below the pin bosses, the control member including an arcuate part in contact with each thrust face and parts extending chordally across the skirt.

24. A piston comprising a head and skirt formed of light-weight material, piston pin bosses, parts of the skirt forming opposite thrust faces, the skirt being formed with openings extending upwardly from its lower edge below the pin bosses, and a control member formed of material less expansible than that of the skirt and located below the pin bosses, the control member including an arcuate part in contact with each thrust face and parts extending chordally across the skirt.

25. A piston comprising a head and skirt formed of light-weight material, piston pin bosses, parts of the skirt forming opposite thrust faces, the upper ends of the thrust faces being separated from the head, and control means including a pair of strut members extending chordally of the piston, the control means being of material less expansible than that of the skirt and being located above the axis of the pin bosses and being constantly in contact with the upper ends of the thrust faces.

26. A piston comprising a head, a skirt, and piston pin bosses, parts of the skirt forming opposite thrust, faces, and a control member located above the pin bosses, the control member including an arcuate part in contact with each thrust face and parts extending chordally across the skirt.

27. A piston comprising a head, a skirt and piston pin bosses, parts of the skirt forming opposite thrust faces, and a control member located above the pin bosses, the control member including a circular part in contact with the skirt walls, and struts extending chordally across the circular part.

28. A piston comprising a head, piston pin bosses, a skirt having thrust faces, the upper ends of the thrust faces being separated from the head, slots extending downwardly from the upper edge of the skirt, openings extending upwardly from the lower edge of the skirt, strut members extending chordally of the skirt above the pin bosses, and strut members extending chordally of the skirt below the pin bosses.

In witness whereof, I have hereunto set my hand and seal at Indianapolis, Indiana, this 2nd day of February, A. D. nineteen hundred and twenty-three.

ADOLPH L. NELSON.